(12) United States Patent
Nasef

(10) Patent No.: US 7,946,075 B2
(45) Date of Patent: May 24, 2011

(54) ADJUSTABLE TACTICAL GUN SIGHT

(76) Inventor: Richard Nasef, Santa Fe, NM (US)

( * ) Notice: Subject to any disclaimer, the term of this patent is extended or adjusted under 35 U.S.C. 154(b) by 164 days.

(21) Appl. No.: 12/316,517

(22) Filed: Dec. 12, 2008

(65) Prior Publication Data

US 2011/0088306 A1 Apr. 21, 2011

Related U.S. Application Data

(60) Provisional application No. 61/007,338, filed on Dec. 12, 2007.

(51) Int. Cl.
*F41G 1/28* (2006.01)
(52) U.S. Cl. .......................................... 42/141; 42/145
(58) Field of Classification Search .................. 42/112, 42/113, 123, 130, 131, 132, 141, 144, 145
See application file for complete search history.

(56) References Cited

U.S. PATENT DOCUMENTS

| | | | |
|---|---|---|---|
| 2,256,411 A | 9/1941 | Russell | |
| 3,744,143 A | 7/1973 | Kilpatrick | |
| 5,519,941 A | 5/1996 | Yusko | |
| 6,058,615 A | 5/2000 | Uhlmann et al. | |
| 6,058,616 A | 5/2000 | Bubits | |
| 6,360,471 B1 | 3/2002 | Stein | |
| 6,360,472 B1 * | 3/2002 | Lorocco | 42/132 |
| 6,481,146 B2 * | 11/2002 | Carrier, III | 42/136 |
| 6,711,846 B1 | 3/2004 | Nasef | |

* cited by examiner

*Primary Examiner* — Stephen M Johnson
(74) *Attorney, Agent, or Firm* — DLA Piper LLP (US)

(57) ABSTRACT

A sight for a firearm including a front sight portion and a rear sight portion. The front sight portion includes a front sight, at least one shim and a front sight and shim pocket whereby at least the elevation of the firearm can be adjusted by changing the shim. The front and rear sight portions are further provided with replaceable colored plastic inserts.

7 Claims, 4 Drawing Sheets

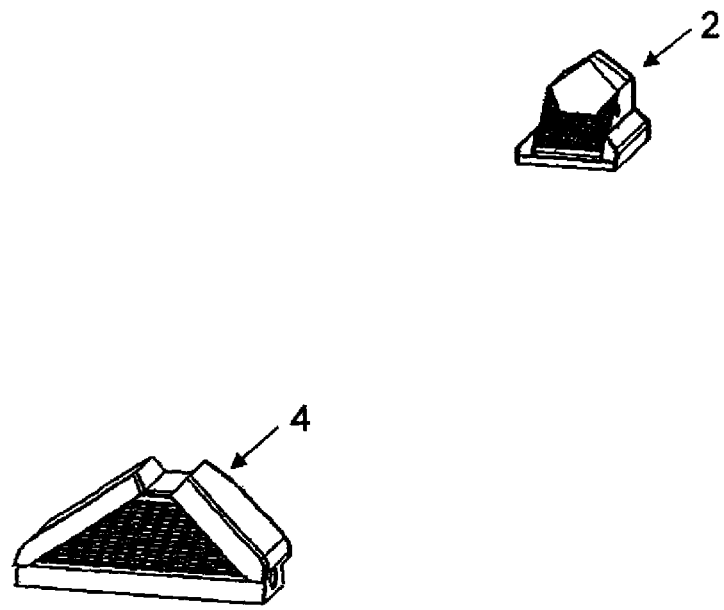
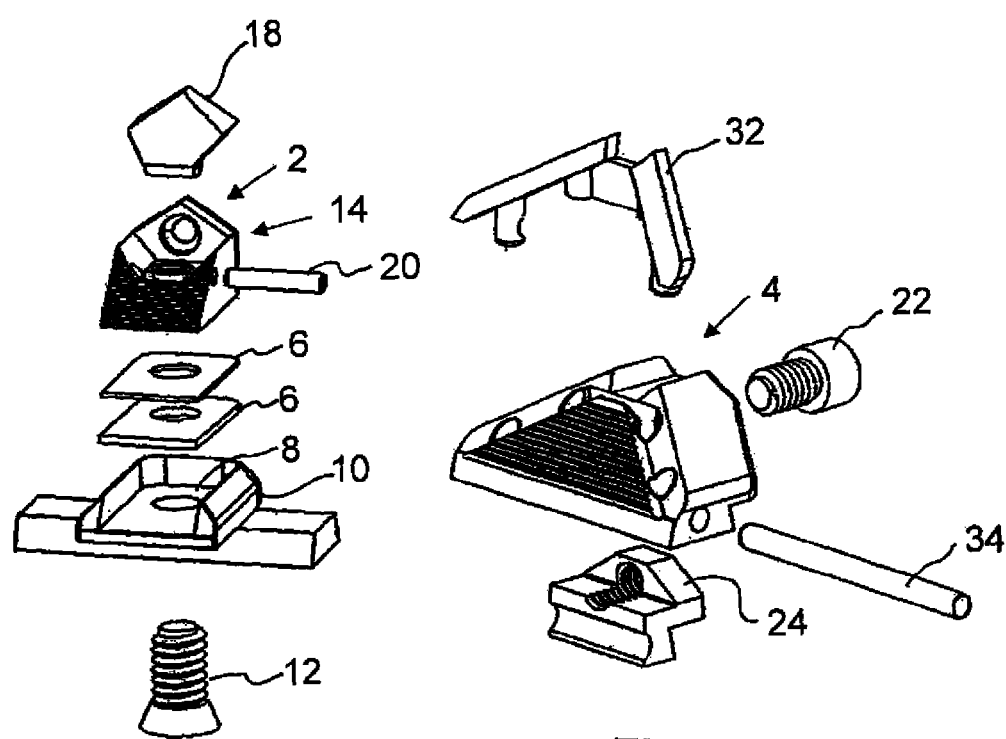
FIG. 1
FIG. 2
FIG. 3

ADJUSTABLE TACTICAL GUN SIGHT

This application claims the benefit or priority from U.S. Provisional Application No. 61/007,388, filed on Dec. 12, 2007.

BACKGROUND OF THE INVENTION

1. Field of the Invention

The present invention relates to gun sights and particularly to gun sights used for tactical situations.

2. Prior Art

There exists gun sights in the prior art which are suitable for tactical uses. However, such gun sights do not provide for quick and automatic alignment of the front and rear sights and easy adjustment of the sights to match the shooter, conditions or the gun.

SUMMARY OF THE INVENTION

Accordingly, it is a general object of the present invention to provide a firearm sight which provides quick and automatic alignment of the front and rear sights and easy adjustments of the sights to match the shooter, condition or firearm.

It is another object of the present invention to provide a firearm sight which is easily adjustable in elevation and windage.

In keeping with the principles and objects of the present invention, the firearm sight of the present invention includes a front sight and a rear sight. The front sight includes a front sight portion, at least one shim and a front sight and shim pocket for mounting at least one shim in said front sight pocket under said front sight portion for adjusting the firearm sight alignment for point of impact, particularly in elevation. Still further, the front and rear sight can be provided with colorful interchangeable inserts which enhance the alignability of the sights. Still further, for a firearm used in poor like conditions, the inserts can be made from fluorescent materials, glow-in-the dark plastics, fiber optic materials or include radioactive materials such as Tritium gas to eliminate the sight.

BRIEF DESCRIPTION OF THE DRAWINGS

The above-mentioned features and objects of the present invention will become more apparent with reference to the following description taken together with the accompanying drawings wherein like reference numerals denote like elements and in which:

FIG. 1 is an isometric view of the unmounted sight elements for the adjustable tactical sight;

FIG. 2 is an enlarged view of a dove tailed type front gun sight assembly;

FIG. 3 is an enlarged exploded view of the rear gun sight assembly;

DETAILED DESCRIPTION OF THE INVENTION

Figure 4:
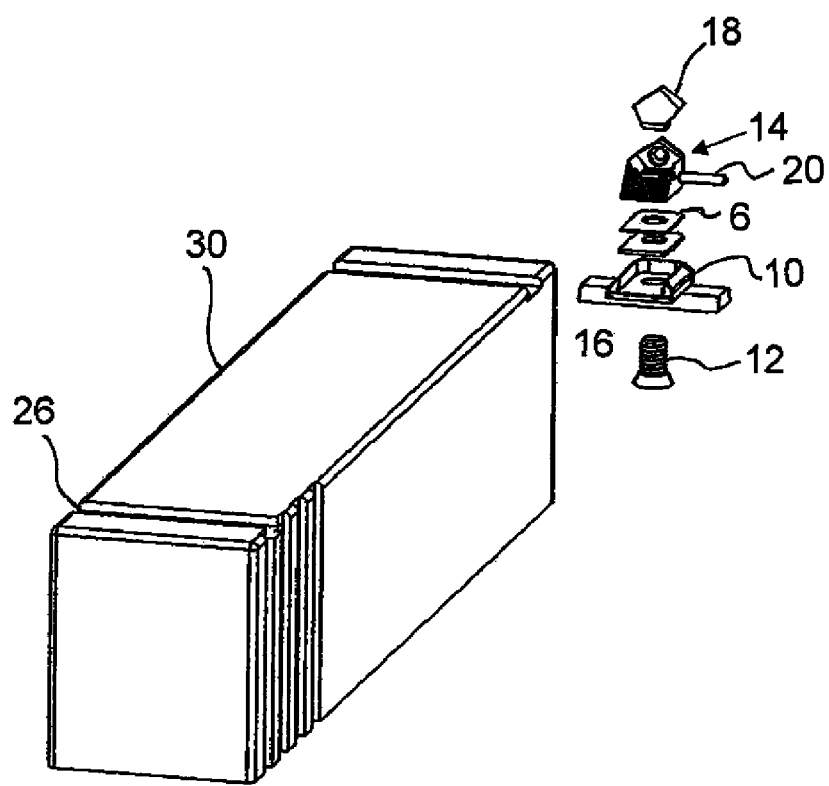
FIG. 4 is an exploded view of the dove tail assembly to be mounted on a slide of a gun.
Figure 6:
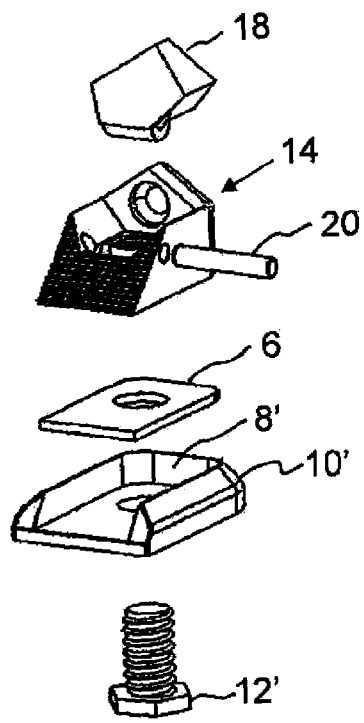
FIG. 6 is an exploded view of a post type front sight with one shim.
Figure 7:
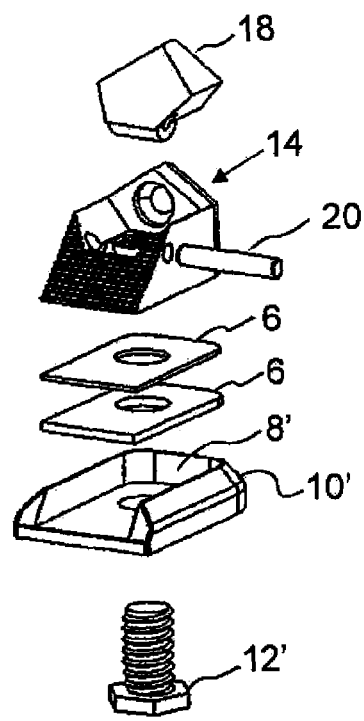
FIG. 7 is an exploded view of a post type front sight with two shims.
Figure 8:
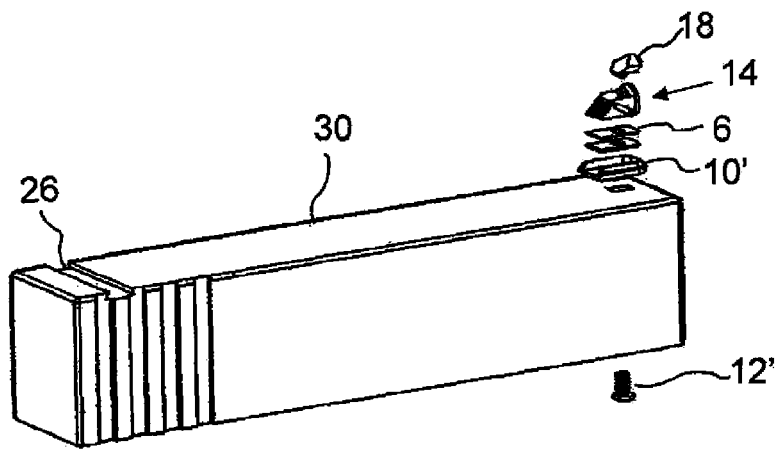
FIG. 8 is an exploded view of a post type front sight assembly to be mounted on a gun slide.
Figure 9:
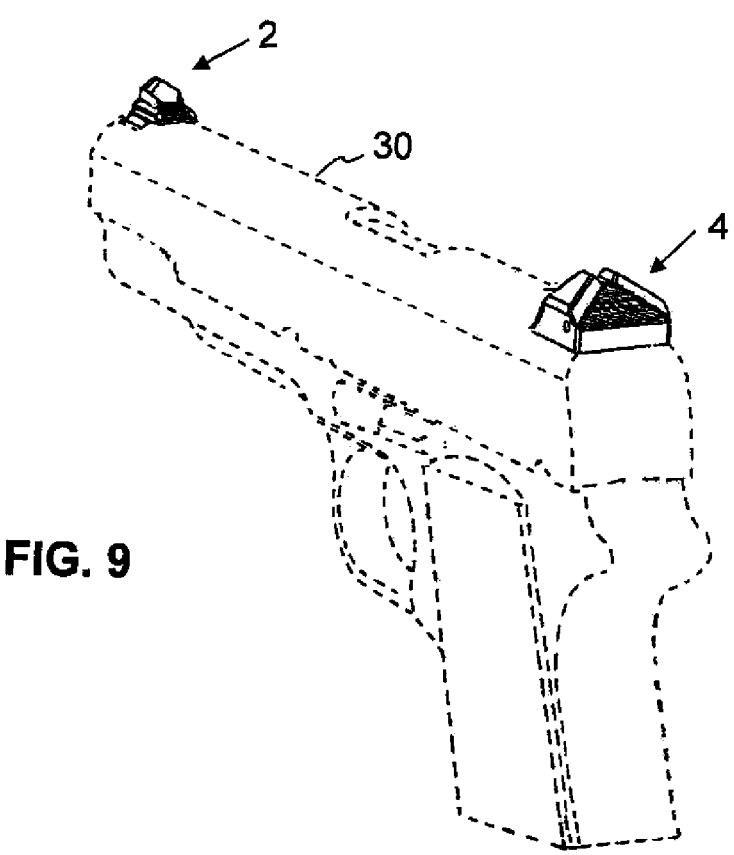
FIG. 9 is a perspective view of he sight elements mounted on a gun with the gun shown in dashed lines.

The front sight 2 adjusts for elevation by adding or subtracting shims 6 from the pocket 8 in the front base, as is shown in FIGS. 2, 4, 6, 7 and 8. The shims 6 are contained by the pocket 8 of the front base 10, and the mounting screw 12. The shims 6 can be different thicknesses or a single laminated shim containing multiple shim layers that can be peeled away to adjust the shim thickness. On the post style front sight 14 the hex style thin head front screw 12 holds the base 10, shims 6 and front sight 2 to the slide, as shown in FIGS. 6, 7 and 8. On the dovetail style front sight 2, the countersunk front screw 12 secures the front sight 2 and shims 6 to the front base 10, as shown in FIGS. 2 and 4. The dovetail type base 10 is then held in the front of the slide 30 by a press fit dovetail 16. The front sight 2 has interchangeable plastic inserts 18 comprising a Pentagon with an upwardly pointing triangular portion that are secured by a cross pin 20 to facilitate the changing of sight color without need for re adjusting sight alignment for point of impact, as shown in FIGS. 2, 4, 6, 7 and 8. The inserts 18 can be made of any polymer, including florescent solids, florescent translucent, florescent transparent. The inserts 18 can also be molded with glow in the dark plastics, or fiber optic materials. Tritium gas may also be used to illuminate the sight 2.

Figure 5:
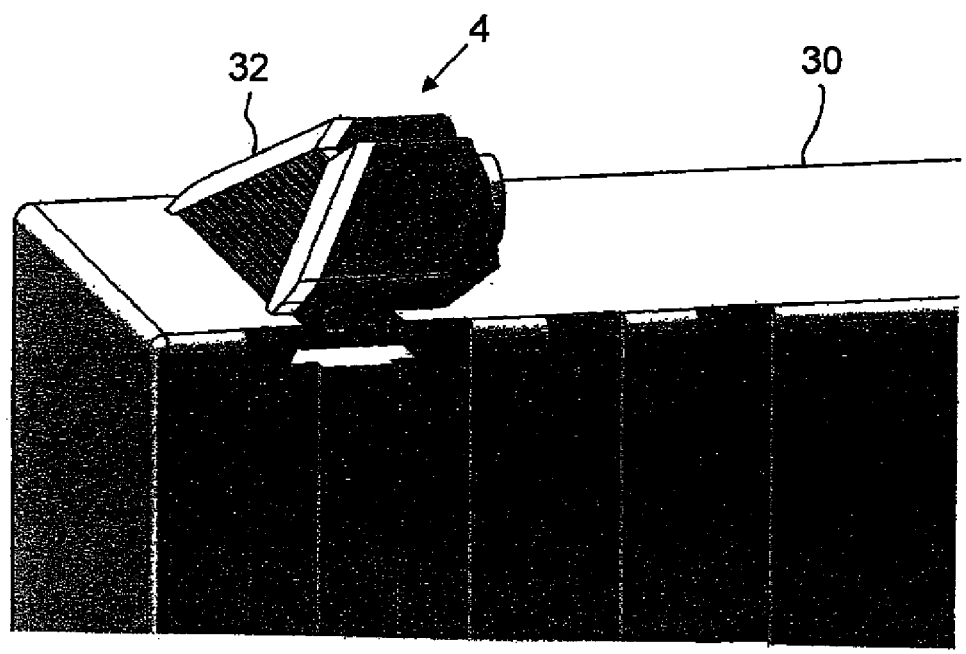
FIG. 5 is a view of a rear sight of the present invention mounted on the slide of a gun.

The rear sight 4 adjusts for windage by pressing the sight left or right. The rear sight 4 incorporates a screw 22 and half dovetail rear nut 24, as shown in FIGS. 3 and 5. When the screw 22 is tightened, the nut 24 pulls towards the muzzle of the weapon, and locks the rear sight 4 in place. Alternatively, the screw 22 can thread through the sight body and push a dovetail 26 towards the rear of the weapon, thereby locking the rear sight 4 in place. In some applications, the rear sight 4 might be mounted in the same manner as the front sight 2 matching the contour of the slide 30. In this instance, elevation and windage adjustments will be made totally by the front sight 2. The rear sight 4 has interchangeable plastic inserts 32 comprising two downwardly extending side arms of a triangle with a notch there between that are secured by a cross pin 34 to facilitate the changing of sight color without need for re adjusting sight alignment for point of impact, as shown in FIGS. 3 and 8. The inserts 34 can be made of any polymer, including florescent solid, florescent translucent, florescent transparent materials. The inserts 34 can also be molded with glow in the dark plastics, or fiber optic materials. Tritium gas may also be used to illuminate the sight.

It should be apparent to those skilled in the art that the above-described embodiments are merely representative of a few of the possible embodiments which one of ordinary skill in the art could create without departing from the spirit and scope of the invention.

The invention claimed is:

1. A sight for a firearm comprising a front sight portion and a rear sight portion, wherein:
    the front sight portion comprises:
        a front sight,
        at least one height adjusting shim,
        a front end shim pocket for mounting said front sight and said at least one shim therein for mounting on a firearm, and
        a recess formed in an upper portion of said front sight and a replaceable insert provided in said recess; and the rear sight portion further includes a recess and a replaceable insert provided in said recess; and said insert in said front sight comprises a pentagon with an upwardly pointing triangular portion and said insert in said rear sight comprises two downwardly extending side arms of a triangle with a notch there between.

2. A sight for a firearm according to claim 1, wherein said front end shim pocket of the front sight portion is provided with a transversely extending dovetail for fitting into a transversely extending dovetail slot in a firearm.

3. The sight for a firearm according to claim 2, wherein said insert in said front sight and said insert in said rear sight are made from plastic.

4. The sight for a firearm according to claim 3, wherein said plastic is selected from polymers including fluorescent solid, translucent and transparent materials.

5. A sight for a firearm according to claim 1, wherein said front sight portion is coupled to said firearm by a screw.

6. The sight for a firearm according to claim 5, wherein said insert in said front sight and said insert in said rear sight are made from plastic.

7. The sight for a firearm according to claim 6, wherein said plastic is selected from polymers including fluorescent solid, translucent and transparent materials.

* * * * *